(12) United States Patent
Carns et al.

(10) Patent No.: US 7,293,741 B2
(45) Date of Patent: Nov. 13, 2007

(54) SYSTEM AND METHODS FOR DISTRIBUTING LOADS FROM FLUID CONDUITS, INCLUDING AIRCRAFT FUEL CONDUITS

(75) Inventors: James A. Carns, Seattle, WA (US); Theron L. Cutler, Seattle, WA (US); Mark A. Shelly, Seattle, WA (US); Benjamin P. Van Kampen, Seattle, WA (US)

(73) Assignee: The Boeing Company, Chicago, IL (US)

( * ) Notice: Subject to any disclaimer, the term of this patent is extended or adjusted under 35 U.S.C. 154(b) by 122 days.

(21) Appl. No.: 11/150,005

(22) Filed: Jun. 9, 2005

(65) Prior Publication Data

US 2006/0278759 A1    Dec. 14, 2006

(51) Int. Cl.
*B64D 39/00*    (2006.01)
(52) U.S. Cl. .................................. 244/135 B
(58) Field of Classification Search ............ 244/135 R, 244/135 A, 136, 123.1, 118.1; 141/284, 141/387, 388
See application file for complete search history.

(56) References Cited

U.S. PATENT DOCUMENTS

| | | | |
|---|---|---|---|
| 2,091,916 A | 8/1937 | Evans |
| 2,213,680 A | 9/1940 | Share |
| 2,414,509 A | 1/1947 | Crot |
| 2,453,553 A | 11/1948 | Tansley |
| 2,475,635 A | 7/1949 | Parsons |
| 2,552,991 A | 5/1951 | McWhorter |
| 2,668,066 A | 2/1954 | Stadelhofer |
| 2,670,913 A | 3/1954 | Castor et al. |
| 2,859,002 A | 11/1958 | Leisy |
| 2,919,937 A | 1/1960 | Dovey |
| 2,953,332 A | 9/1960 | Cobham et al. |
| 2,960,295 A | 11/1960 | Schulze |

(Continued)

FOREIGN PATENT DOCUMENTS

DE        27 44 674 A1        4/1979

(Continued)

OTHER PUBLICATIONS

U.S. Appl. No. 10/857,226, Schroeder.

(Continued)

*Primary Examiner*—Robert P. Swiatek
(74) *Attorney, Agent, or Firm*—Perkins Coie LLP (57) ABSTRACT

Systems and methods for distributing loads from fluid conduits, including aircraft fuel conduits, are disclosed. An aircraft configured in accordance with one embodiment of the invention includes a fuselage portion, a wing portion, and a fuel tank carried by least one of the fuselage portion and the wing portion. The aircraft also includes a spar carried by at least one of the fuselage portion and the wing portion. The spar includes a first spar rib and a second spar rib spaced apart from the first spar rib. The aircraft further includes a fluid conduit proximate to the spar and operably coupled to the fuel tank. A support member carrying the fluid conduit is operably coupled to the spar. The support member can be positioned to transfer at least approximately all of the axial loads from the fluid conduit to at least one of the first spar rib and the second spar rib.

11 Claims, 7 Drawing Sheets

U.S. PATENT DOCUMENTS

| | | |
|---|---|---|
| 2,973,171 A | 2/1961 | Ward et al. |
| 3,747,873 A | 7/1973 | Layer et al. |
| 3,836,117 A | 9/1974 | Panicall |
| 3,928,903 A | 12/1975 | Richardson et al. |
| 4,044,834 A | 8/1977 | Perkins |
| 4,072,283 A | 2/1978 | Weiland |
| 4,095,761 A | 6/1978 | Anderson et al. |
| 4,119,294 A | 10/1978 | Schnorrenberg |
| 4,129,270 A | 12/1978 | Robinson et al. |
| 4,149,739 A | 4/1979 | Morris |
| 4,150,803 A | 4/1979 | Fernandez |
| 4,231,536 A | 11/1980 | Ishimitsu et al. |
| 4,327,784 A | 5/1982 | Denniston |
| 4,408,943 A | 10/1983 | McTamaney et al. |
| 4,438,793 A | 3/1984 | Brown |
| 4,471,809 A | 9/1984 | Thomsen et al. |
| 4,477,040 A | 10/1984 | Karanik |
| 4,534,384 A | 8/1985 | Graham et al. |
| 4,540,144 A | 9/1985 | Perrella |
| 4,586,683 A | 5/1986 | Kerker |
| 4,665,936 A | 5/1987 | Furrer |
| 4,717,099 A | 1/1988 | Hubbard |
| 4,796,838 A | 1/1989 | Yamamoto |
| 4,883,102 A | 11/1989 | Gabrielyan et al. |
| 4,929,000 A | 5/1990 | Annestedt, Sr. |
| 5,131,438 A | 7/1992 | Loucks |
| 5,141,178 A | 8/1992 | Alden et al. |
| 5,255,877 A | 10/1993 | Lindgren et al. |
| 5,393,015 A | 2/1995 | Piasecki |
| 5,427,333 A | 6/1995 | Kirkland |
| 5,449,203 A | 9/1995 | Sharp |
| 5,449,204 A | 9/1995 | Greene et al. |
| 5,530,650 A | 6/1996 | Biferno et al. |
| 5,539,624 A | 7/1996 | Dougherty |
| 5,573,206 A | 11/1996 | Ward |
| 5,785,276 A | 7/1998 | Ruzicka |
| 5,810,292 A | 9/1998 | Garcia, Jr. et al. |
| 5,904,729 A | 5/1999 | Ruzicka |
| 5,906,336 A | 5/1999 | Eckstein |
| 5,921,294 A | 7/1999 | Greenhalgh et al. |
| 5,996,939 A | 12/1999 | Higgs et al. |
| 6,076,555 A | 6/2000 | Hettinger |
| 6,119,981 A | 9/2000 | Young et al. |
| 6,145,788 A | 11/2000 | Mouskis et al. |
| 6,302,448 B1 | 10/2001 | Van Der Meer et al. |
| 6,305,336 B1 | 10/2001 | Hara et al. |
| 6,324,295 B1 | 11/2001 | Valery et al. |
| 6,326,873 B1 | 12/2001 | Faria |
| 6,375,123 B1 | 4/2002 | Greenhalgh et al. |
| 6,428,054 B1 | 8/2002 | Zappa et al. |
| 6,454,212 B1 | 9/2002 | Bartov |
| 6,464,173 B1 | 10/2002 | Bandak |
| 6,467,725 B1 | 10/2002 | Coles et al. |
| 6,588,465 B1 | 7/2003 | Kirkland et al. |
| 6,598,830 B1 | 7/2003 | Ambrose et al. |
| 6,601,800 B2 | 8/2003 | Ollar |
| 6,604,711 B1 | 8/2003 | Sinha et al. |
| 6,651,933 B1 | 11/2003 | von Thal et al. |
| 6,669,145 B1 | 12/2003 | Green |
| 6,676,379 B2 | 1/2004 | Eccles et al. |
| 6,752,357 B2 | 6/2004 | Thal et al. |
| 6,779,758 B2 | 8/2004 | Vu et al. |
| 6,796,527 B1 | 9/2004 | Munoz et al. |
| 6,819,982 B2 | 11/2004 | Doane |
| 6,824,105 B2 | 11/2004 | Edwards et al. |
| 6,832,743 B2 | 12/2004 | Schneider et al. |
| 6,837,462 B2 | 1/2005 | von Thal et al. |
| 6,838,720 B2 | 1/2005 | Krieger et al. |
| 2003/0038214 A1 | 2/2003 | Bartov |
| 2003/0097658 A1 | 5/2003 | Richards |
| 2003/0136874 A1 | 7/2003 | Gjerdrum |
| 2004/0129865 A1 | 7/2004 | Doane |
| 2005/0055143 A1 | 3/2005 | Doane |
| 2006/0071475 A1 | 4/2006 | James et al. |
| 2006/0278759 A1 | 12/2006 | Carns et al. |
| 2006/0284018 A1 | 12/2006 | Carns et al. |

FOREIGN PATENT DOCUMENTS

| | | |
|---|---|---|
| DE | 2744674 | 4/1979 |
| DE | 29901583 | 5/1999 |
| DE | 10013751 | 10/2001 |
| EP | 0807577 | 11/1997 |
| EP | 1094001 | 4/2001 |
| EP | 1361156 | 11/2003 |
| EP | 1695911 | 8/2006 |
| GB | 555984 | 9/1943 |
| GB | 2257458 | 1/1993 |
| GB | 2373488 | 9/2002 |
| IT | 128459 | 5/2003 |
| RU | 673798 | 7/1979 |
| RU | 953345 | 8/1982 |
| RU | 2111154 | 5/1998 |
| RU | 2140381 | 10/1999 |
| RU | 2142897 | 12/1999 |
| TW | 386966 | 4/2000 |
| WO | WO-85/02003 | 5/1985 |
| WO | WO-91/06471 | 5/1991 |
| WO | WO-97/33792 | 9/1997 |
| WO | WO-98/07623 | 2/1998 |
| WO | WO-98/39208 | 9/1998 |
| WO | WO-98/54053 | 12/1998 |
| WO | WO-02/24529 | 3/2002 |
| WO | WO-02/76826 | 10/2002 |
| WO | WO-03/102509 | 12/2003 |

OTHER PUBLICATIONS

U.S. Appl. No. 10/890,664, Schroeder.
U.S. Appl. No. 10/896,584, Schroeder.
U.S. Appl. No. 11/078,210, Smith.
Flug Revue, "Airbus (Air Tanker) A330-200 Tanker," Jan. 26, 2004, www.flug-revue.rotor.com/FRTyper/FRA3302T.htm; MotorpPresse Stuttgart, Bonn, German, (5 pgs).
Thales Avionics Ltd., "Air Tanker Bids for Future Strategic Tanker Aircraft," Jul. 3, 2001; www.thalesavionics.net/press/pr43.html; (3 pgs).
Keller, George R., "Hydraulic System Analysis", pp. 40-41, 1985, Hydraulics & Pneumatics, Cleveland, Ohio.
European Search Report for EP06 25 2991: The Boeing Company: Nov. 7, 2006: 9 pp.: European Patent Office.

SYSTEM AND METHODS FOR DISTRIBUTING LOADS FROM FLUID CONDUITS, INCLUDING AIRCRAFT FUEL CONDUITS

TECHNICAL FIELD

The present invention is directed generally toward systems and methods for distributing loads from fluid conduits, including aircraft-based systems.

BACKGROUND

Commercial transport aircraft are typically designed to carry a given load of passengers, cargo, or passengers and cargo over a given range. Occasionally, however, the need arises to change the role of the aircraft. For example, some commercial transport aircraft may be converted to aerial refueling tankers and/or receiver aircraft (i.e., the aircraft to be refueled). Although in-flight refueling (or air-to-air refueling) is a relatively common operation, especially for military aircraft, the conversion of a commercial transport aircraft to include in-flight refueling capabilities includes converting a number of aircraft systems. One such system that must be converted is the fuel system.

Modern aircraft include complex fuel systems that route aviation fuel from fuel tanks to aircraft systems that use the fuel. These aircraft systems can include the primary engines and/or auxiliary power units (APUs). In the case of an aerial refueling tanker and/or receiver aircraft, these systems can also include the fluid conduits (e.g., fuel lines), manifolds, and associated valving necessary for delivering fuel to a receiver aircraft and/or receiving fuel in-flight from a tanker aircraft. In a receiver aircraft, for example, the fuel lines pass from a forward portion of the aircraft (where the fuel is received from the tanker aircraft), through at least a portion of the fuselage, and into one or more fuel tanks of the receiver aircraft. Furthermore, the fuel lines may pass through "ignition zones," which are typically pressurized compartments in the aircraft (e.g., baggage compartments) that may also house electrical devices.

One concern with this arrangement is that the fuel passing through the fluid conduits imparts substantial loads on the fluid conduits and other structures of the aircraft that were not designed for such loads, particularly in the case of converted aircraft. Accordingly, there is a need to transfer the imposed loads from the fluid conduits to the appropriate reaction locations of the aircraft. The loads must be transferred (a) in accordance with various loading conditions imposed by regulatory agencies, (b) without venting hazardous fuels in an undesired area, and (c) without violating Federal Aviation Administration (FAA) regulations requiring accessible and shrouded fuel lines.

SUMMARY

The invention is directed generally toward systems and methods for distributing loads from fluid conduits. An aircraft configured in accordance with one embodiment of the invention includes a fuselage portion, a wing portion, and a fuel tank carried by least one of the fuselage portion and the wing portion. The aircraft also includes a spar carried by at least one of the fuselage portion and the wing portion. The spar includes a first spar rib and a second spar rib spaced apart from the first spar rib. The aircraft further includes a fluid conduit proximate to the spar and operably coupled to the fuel tank. A support member carrying the fluid conduit is operably coupled to the spar. The support member can be positioned to transfer at least approximately all of the axial loads from the fluid conduit to at least one of the first spar rib and the second spar rib.

A fluid transmission system configured in accordance with another embodiment of the invention includes a first support member having a web portion, a first rib extending outwardly generally normal to the web portion, and a second rib spaced apart from the first rib and extending outwardly generally normal to the web portion. The fluid transmission system also includes a fluid conduit having a first end and a second end spaced apart from the first end. The first end of the fluid conduit includes a first coupling positioned for attachment to the first support member. The second end of the fluid conduit includes a second coupling positioned for engagement with a corresponding coupling of another fluid conduit. The fluid transmission system further includes a second support member carrying the fluid conduit. The second support member can be operably coupled to the first support member and positioned to transfer (a) at least approximately all the axial loads from the fluid conduit to at least one of the first rib and the second rib of the first support member, and (b) at least approximately all the shear loads from the first coupling to the web portion of the first support member.

A method for distributing loads from a fluid conduit in accordance with another aspect of the invention can include attaching a support member to a fluid conduit. The method can further include attaching the support member and fluid conduit to a spar. The spar includes a first spar rib and a second spar rib spaced apart from the first spar rib. The method also includes transferring at least approximately all the axial loads of the fluid conduit from the support member to at least one of the first spar rib and the second spar rib.

DETAILED DESCRIPTION

The present disclosure describes systems and methods for transferring loads from fluid conduits. Certain specific details are set forth in the following description and in FIGS. 1–5B to provide a thorough understanding of various embodiments of the invention. Well-known structures, systems and methods often associated with such systems have not been shown or described in detail to avoid unnecessarily obscuring the description of the various embodiments of the invention. In addition, those of ordinary skill in the relevant art will understand that additional embodiments of the invention may be practiced without several of the details described below.

Figure 1:
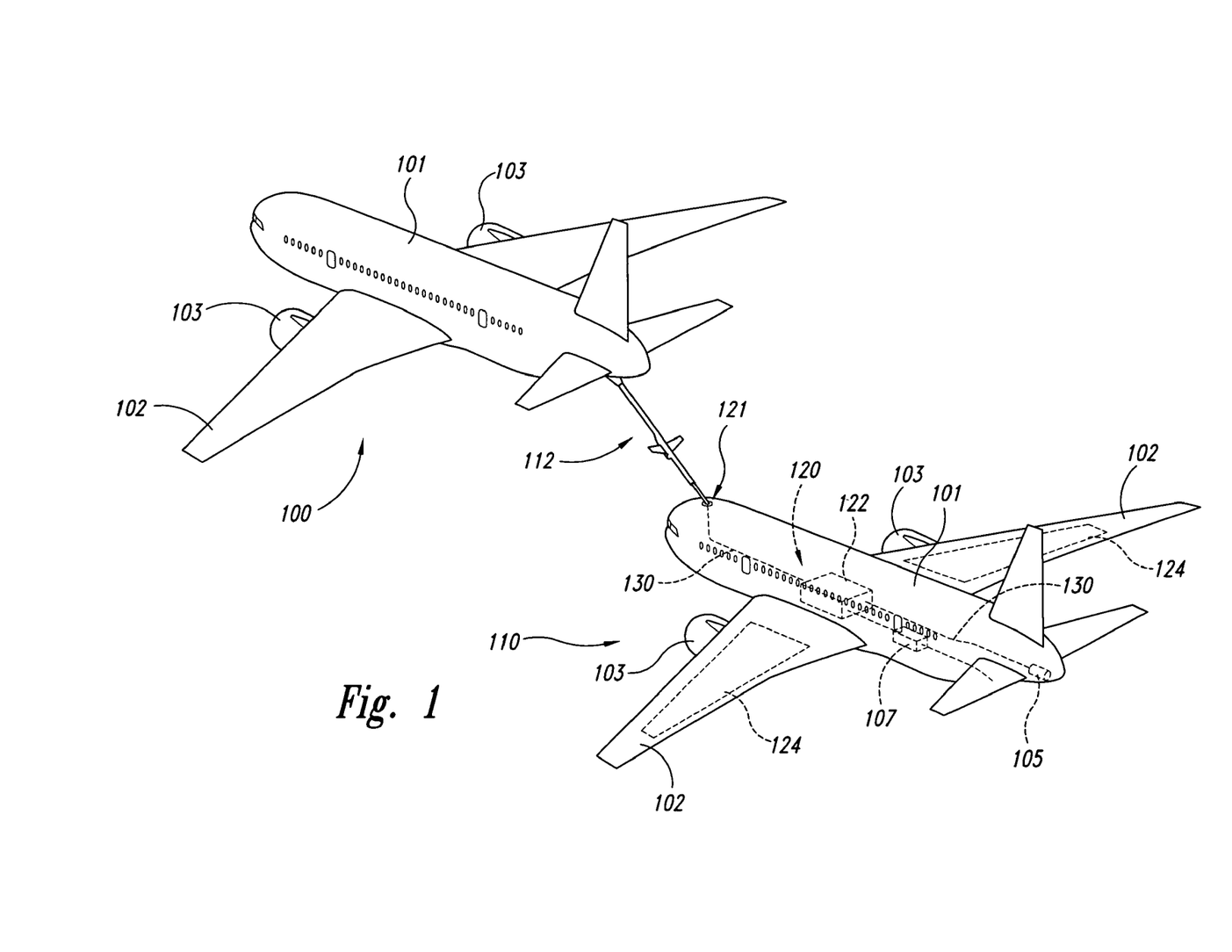
FIG. 1 is a partially schematic, isometric illustration of a refueling aircraft positioned to refuel a receiver aircraft having a fluid conduit configured in accordance with an embodiment of the invention.

FIG. 1 illustrates a tanker aircraft 100 (e.g., a refueling aircraft) in the process of refueling a receiver aircraft 110 with an aerial refueling device 112. The tanker aircraft 100 and receiver aircraft 110 can each include a fuselage 101, wings 102, and one or more engines 103 (two are shown in FIG. 1 as being carried by the wings 102). In other embodiments, the tanker aircraft 100 and receiver aircraft 110 can have other configurations. In several embodiments, for example, the receiver aircraft 110 may be configured for dual operation as both a receiver aircraft and a tanker aircraft. In a particular aspect of the embodiment shown in FIG. 1, the receiver aircraft 110 includes a fuel system 120 configured to receive fuel from the tanker aircraft 100. The fuel system 120 includes a fuel receptacle 121 configured to receive at least a portion of the aerial refueling device 112, a center fuel tank 122, wing-mounted fuel tanks 124, and fluid conduits 130 (e.g., fuel lines) through which the fuel travels throughout the aircraft 110 to the various aircraft systems. These systems can include the engines 103, an APU 105, and an aerial refueling system 107. The fluid conduits 130 are configured to provide fuel to the various aircraft systems in a manner that reduces and/or eliminates the likelihood of leaking fuel and/or fuel vapors into pressurized compartments through which the fluid conduits 130 pass. Further details of the fluid conduits 130 and associated systems and methods for transferring loads from the fluid conduits are described below with reference to FIGS. 2–5B.

Figure 2:
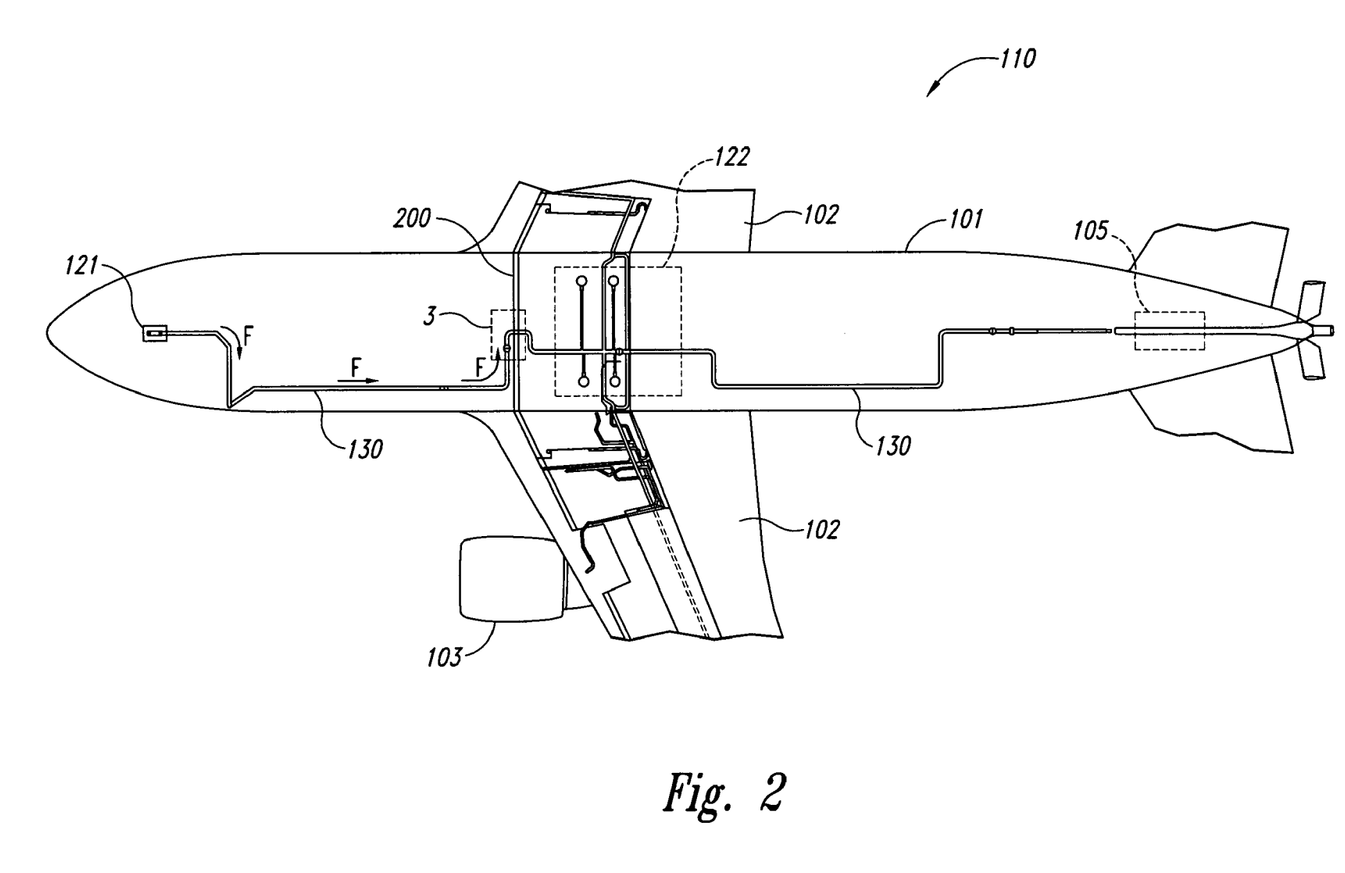
FIG. 2 is a partially schematic top plan view of a portion of the receiver aircraft of FIG. 1.

FIG. 2 is a partially schematic top plan view of a portion of the receiver aircraft 110 of FIG. 1. In one aspect of this embodiment, the fuel from the tanker aircraft 100 (FIG. 1) enters the receiver aircraft 110 at the fuel receptacle 121 at a forward portion of the receiver aircraft 110 and travels through the fluid conduit 130 (as shown by the arrows F) to the center fuel tank 122 and various other aircraft systems as described above. The fluid conduit 130 passes through a front spar 200 of the receiver aircraft 110 before reaching the center fuel tank 122. The front spar 200 is positioned to carry a variety of flight loads, including at least a portion of the loads (e.g., surge loads, shear loads, axial loads) from the fluid conduit 130. Certain portions of the front spar 200, however, can carry only shear loads (not axial loads). Accordingly, the axial loads must be transferred to other suitable portions of the front spar 200. Further details regarding transfer of the loads from the fluid conduit 130 to the front spar 200 are described below with reference to FIGS. 5A and 5B.

Figure 3:
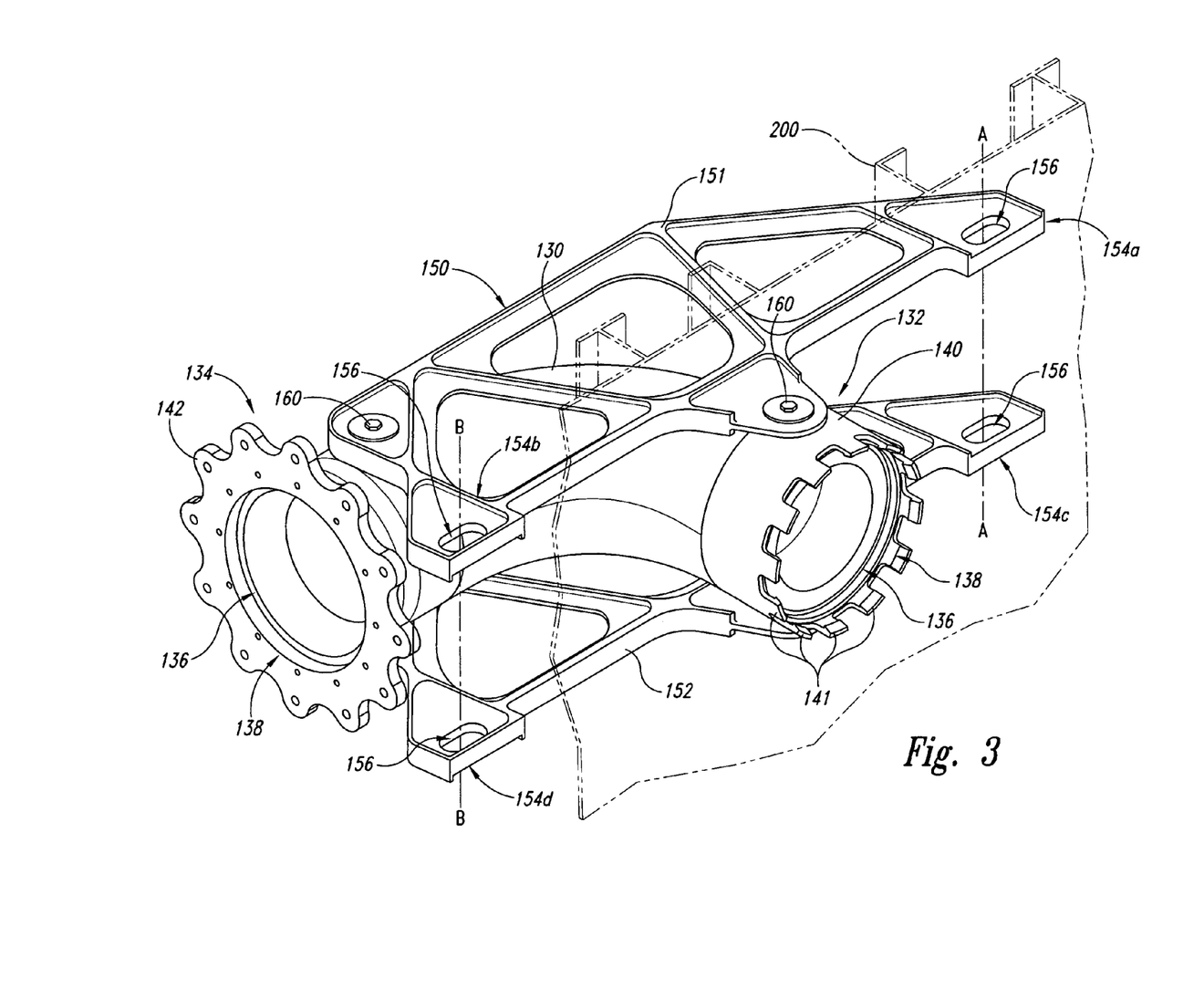
FIG. 3 is an isometric illustration of a fluid conduit and a support member configured in accordance with an embodiment of the invention.

FIG. 3 is an isometric illustration of a portion of the fluid conduit 130 shown in area 3 of FIG. 2 and a support member 150 configured in accordance with an embodiment of the invention. The fluid conduit 130 includes a first end 132 and a second end 134 spaced apart from the first end 132. The fluid conduit 130 can include a first or inner conduit 136 surrounded by a second or outer conduit 138. The inner conduit 136 can be configured to carry fuel or other types of liquids. The outer conduit 138 can provide a protective shroud around the inner conduit 136 in case of a liquid and/or vapor leak in the inner conduit 136. Accordingly, the inner conduit 136 and outer conduit 138 are normally isolated from fluid communication with each other. Suitable shrouded fuel conduits are disclosed in U.S. Pat. No. 6,848,720, which is incorporated herein by reference.

The first end 132 of the fluid conduit 130 can include a first coupling 140 having a plurality of teeth 141 configured to be operably coupled to a spar coupling (as described below with reference to FIGS. 4A and 4B). The second end 134 of the fluid conduit 130 includes a second coupling 142 positioned for engagement with a corresponding coupling of another portion of the fluid conduit (FIG. 2).

The support member 150 can include a first portion 151 operably coupled to one side of the fluid conduit 130 with one or more fasteners 160 (two are shown in FIG. 3) and a second portion 152 operably coupled to a generally opposite side of the fluid conduit 130 with one or more fasteners (not shown). The first and second portions 151 and 152 of the support member 150 each include one or more attachment portions 154 positioned to operably couple the support member 150 (and the attached fluid conduit 130) to the front spar 200 (shown in broken lines). In the illustrated embodiment, for example, the first portion 151 of the support member 150 includes a first attachment portion 154a and a second attachment portion 154b, and the second portion 152 of the support member 150 includes a third attachment portion 154c and a fourth attachment portion 154d. In one aspect of this embodiment, the first and third attachment portions 154a and 154c are generally aligned along an attachment axis A and the second and fourth attachment portions 154b and 154b are generally aligned along an attachment axis B. Each of the attachment portions 154a–d can further include a slot 156. Each slot 156 is configured to receive a fastener for coupling an attachment portion 154a–d of the support member 150 to a corresponding portion of the front spar 200. As discussed below, the slots 156 are positioned to transfer only axial loads from the fluid conduit 130 to the front spar 200 when the support member 150 is attached to the front spar.

Figure 4A:
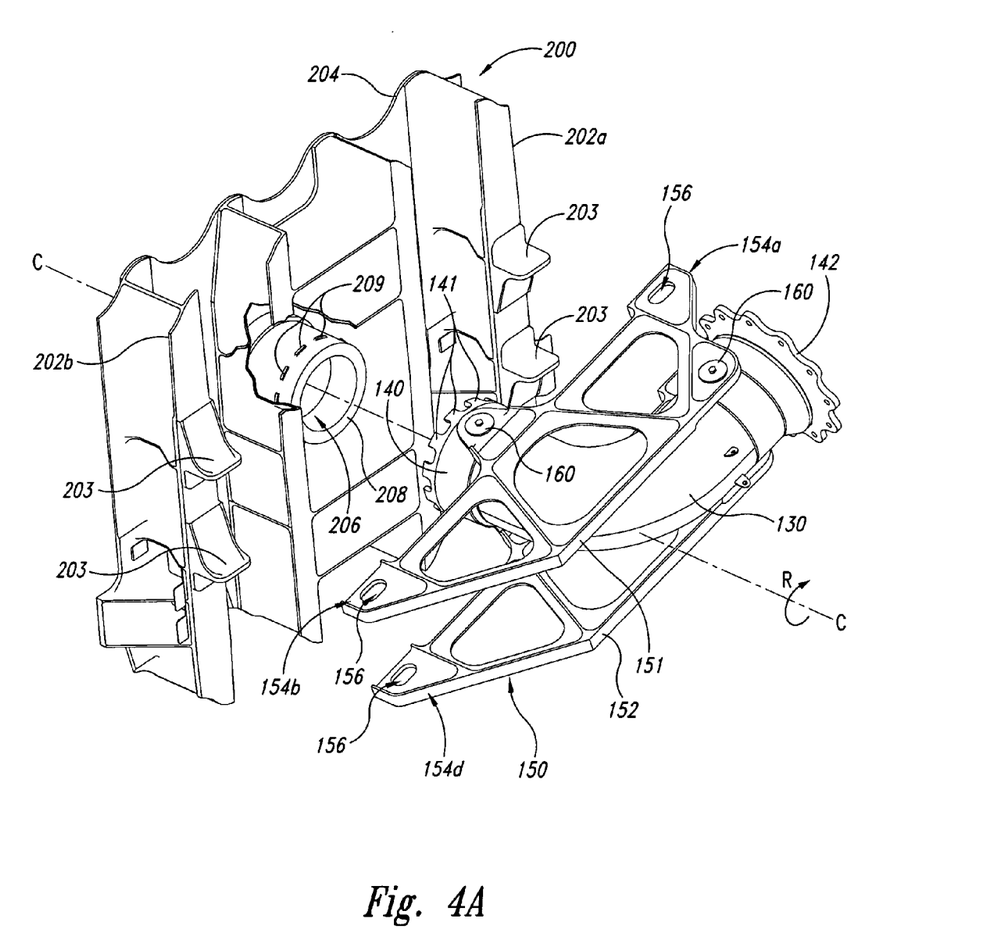
FIGS. 4A–4D are isometric illustrations of stages of a method for coupling the fluid conduit and support member of FIG. 3 to a front spar of a receiver aircraft to transfer at least a portion of the loads from the fluid conduit to the front spar.

FIGS. 4A–4D are isometric illustrations of stages of a method for coupling the fluid conduit 130 and support member 150 of FIG. 3 to the front spar 200 of the receiver aircraft 110 (FIG. 2) to transfer at least a portion of the loads from the fluid conduit 130 to the front spar 200. FIG. 4A, for example, illustrates the fluid conduit 130 and support member 150 positioned for attachment to the front spar 200. The front spar 200 includes a first spar rib 202a, a second spar rib 202b spaced apart from the first spar rib 202a, and a base portion 204 (e.g., a spar web) extending between the first spar rib 202a and the second spar rib 202b. As mentioned previously, the front spar 200 is configured to take a variety of loads (e.g., flight loads) from the receiver aircraft 110. The first and second spar ribs 202a and 202b, for example, are spar stiffeners that extend outwardly from the base portion 204 and are configured to take at least a portion of the bending loads from the front spar 200. The first and second spar ribs 202a and 202b each include brackets 203 positioned to receive corresponding portions of the support member 150. In the illustrated embodiment, each spar rib 202a and 202b includes two brackets 203. In other embodiments, however, the spar ribs 202a and 202b may include a different number of brackets 203. A fluid passageway 206 extends through the spar web 204. The fluid passageway 206 includes a spar coupling 208 positioned for attachment to the first coupling 140 of the fluid conduit 130, as described in greater detail below. In other embodiments, the front spar 200 may have a different configuration and/or may include different features.

In one aspect of this embodiment, the fluid conduit 130 and support member 150 are positioned along an installation axis C extending outwardly generally normal to the front spar 200. As described below with respect to FIG. 4B, the fluid conduit 130 and support member 150 can be rotated about the installation axis C during installation (as shown by the arrow R). In other embodiments, the fluid conduit 130 and support member 150 may have a different spatial relationship with respect to the front spar 200 before attachment.

In another aspect of this embodiment, one or more teeth 141 of the first coupling 140 are positioned to engage corresponding projections 209 of the spar coupling 208. In operation, at least a portion of the teeth 141 interlock with corresponding projections 209 to form a locking feature, which is described in more detail below with respect to FIG. 5B.

Figure 4B:
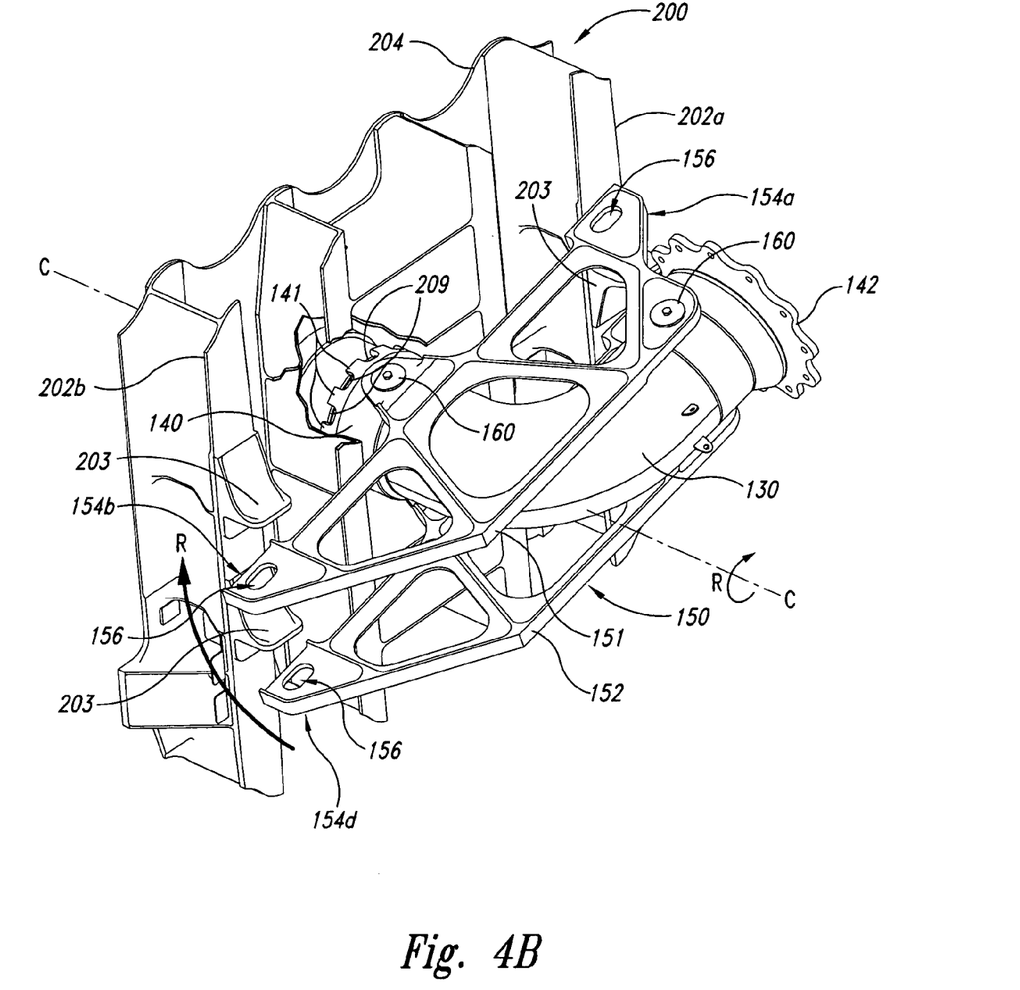

Referring next to FIG. 4B, the fluid conduit 130 and support member 150 have been brought into engagement with at least a portion of the front spar 200. More specifically, the first coupling 140 of the fluid conduit 130 has been moved axially along installation axis C into engagement with the spar coupling 208. After engaging the first coupling 140 with the spar coupling 208, the fluid conduit 130 and support member 150 are rotated as a unit in a clockwise direction about the installation axis C (as shown by the arrows R) to (a) move the attachment portions 154a–d of the support member 150 into position for attachment to the brackets 203 of the first spar rib 202a and the second spar rib 202b, and (b) engage the locking feature between the first coupling 140 and the spar coupling 208.

Figure 4C:
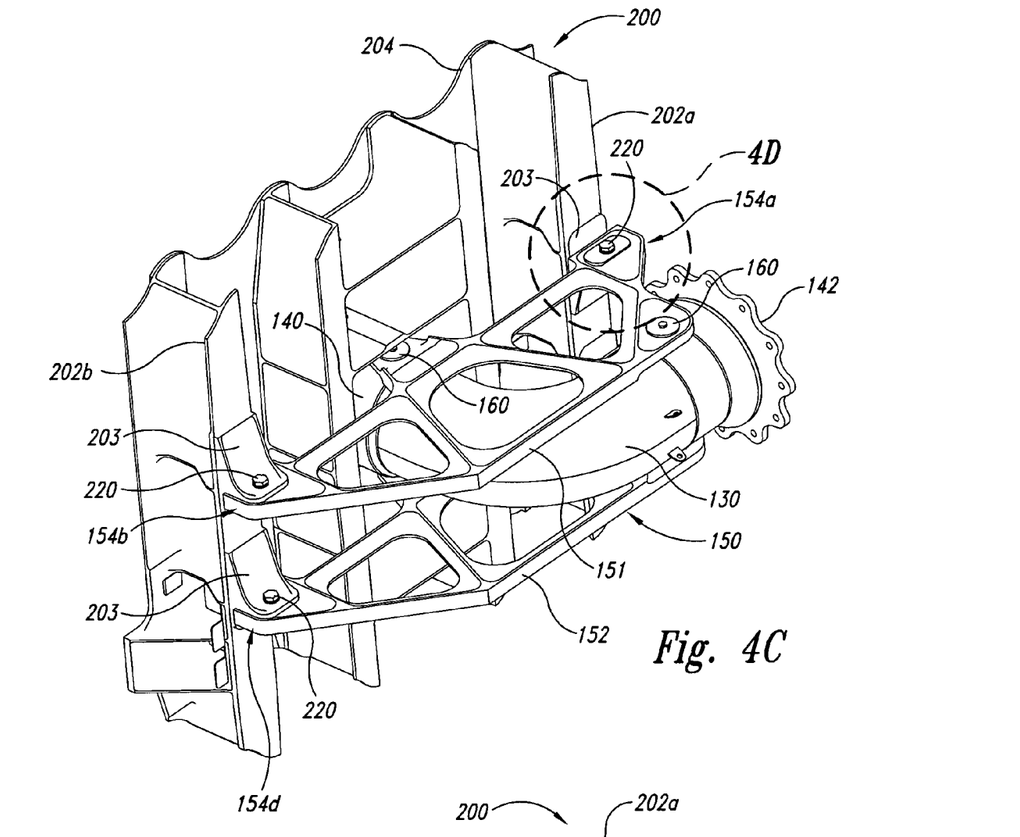

Referring next to FIG. 4C, the fluid conduit 130 and support member 150 have been rotated into their final installation position and the support member 150 has been operably coupled to corresponding portions of the front spar 200. More specifically, the first and third attachment portions 154a and 154c (not shown in FIG. 4C) of the support member 150 are coupled to brackets 203 on the first spar rib 202a and the second and fourth attachment portions 154b and 154d are coupled to brackets 203 on the second spar rib 202b. Each attachment portion 154a–d can be coupled to the corresponding bracket 203 with a bolt 220 or other suitable fasteners.

Figure 4D:
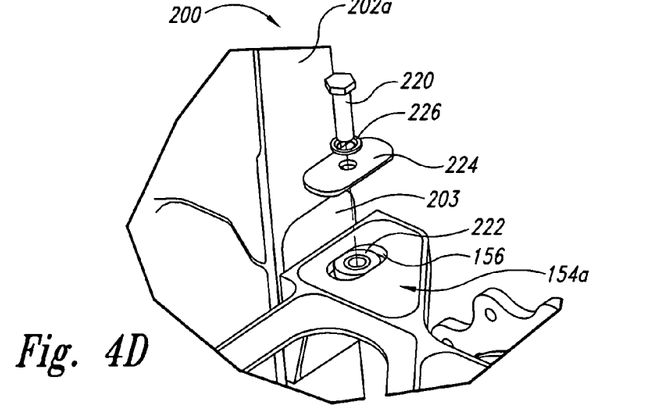

FIG. 4D is an isometric illustration of the area 4D of FIG. 4C showing an exploded view of the first attachment portion 154a positioned for attachment to the corresponding bracket 203 of the first spar rib 202a. A spacer 222 is positioned within the slot 156 and is generally a similar size as the slot 156. A cap 224 and a washer 226 are then positioned in and/or on the slot 156. The cap 224 and washer 226 help prevent the bolt 220 from slipping or otherwise loosening. The bolt 220 extends through the cap 224, washer 226, spacer 222, and at least a portion of the bracket 203 to couple the support member 150 to the first spar rib 202a. Each of the other attachment portions 154b–d can be coupled to corresponding brackets 203 of the front spar 200 using a generally similar arrangement. In other embodiments, the support member 150 may be coupled to the brackets 203 of the front spar 200 using other suitable methods and/or arrangements.

Figure 5A:
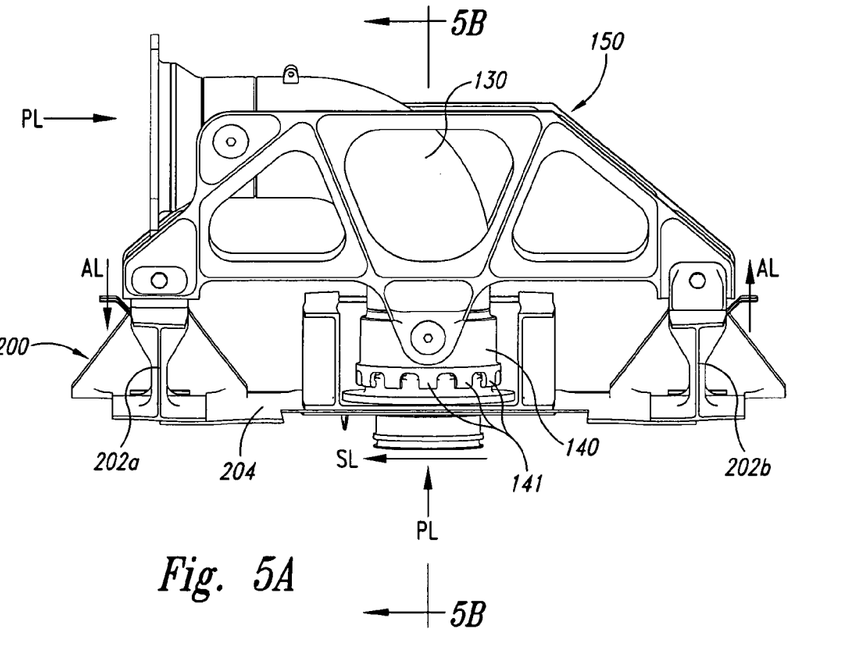
FIG. 5A is a top plan view of the fluid conduit and support member operably coupled to the front spar of the receiver aircraft.

FIG. 5A is a top plan view of the fluid conduit 130 and support member 150 operably coupled to the front spar 200 of the receiver aircraft 110 (FIG. 2). The fuel passing through the fluid conduit 130 to and/or from the fuel tank 122 (FIG. 2) exerts pressure loads PL at both the first end 132 and the second end 134 of the fluid conduit 130. In one aspect of this embodiment, at least approximately all the pressure loads PL acting on the fluid conduit 130 are transferred to appropriate reaction locations on the front spar 200 through the first coupling 140 and the support member 150. For example, certain portions of the front spar 200 (e.g., the base portion 204) can carry only shear loads (not axial loads). Therefore, the axial loads must be transferred to other suitable reaction locations (e.g., the first and second spar ribs 202a and 202b). In the illustrated embodiment, for example, the axial loads AL are transferred to the first spar rib 202a in a first direction and to the second spar rib 202b in a second direction generally opposite the first direction. Accordingly, the first coupling 140 attached to the spar coupling 208 transfers only shear loads SL to the surrounding structure (e.g., the base portion 204) of the front spar 200. The shear loads SL are transferred in a third direction generally normal to the first and second directions.

Figure 5B:
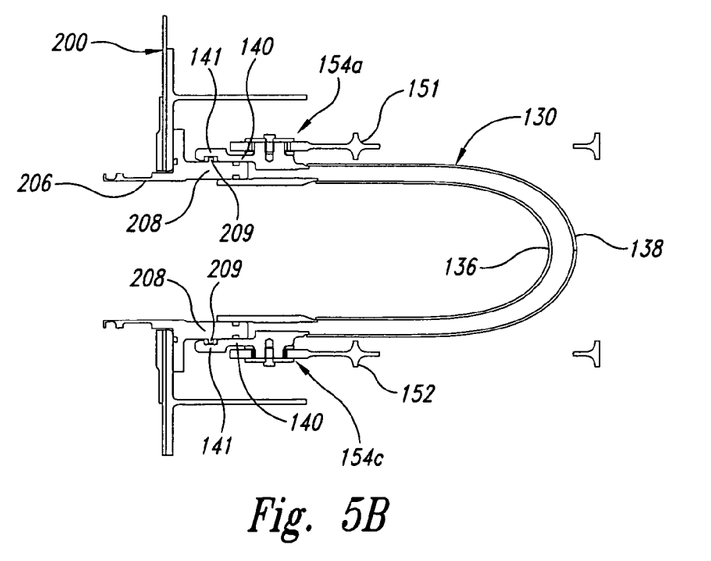
FIG. 5B is a side cross-sectional view taken along line 5B—5B of FIG. 5A.

FIG. 5B is a side cross-sectional view taken along line 5B—5B of FIG. 5A. As best seen in FIG. 5B, one feature of several embodiments of the fluid conduit 130 described above is that at least a portion of the teeth 141 of the first coupling 140 engage corresponding projections 209 of the spar coupling 208 to form a locking feature 230 (e.g., a bayonet fitting) that provides a measure of redundancy for locking the fluid conduit 130 in place with respect to the front spar 200. For example, the locking feature 230 can at least temporarily carry all the loads (e.g., both the shear loads and the axial loads) from the fluid conduit 130 in the event the support member 150 fails or becomes at least partially detached from the front spar 200.

One feature of at least some of the embodiments of the fluid conduit 130 and support member 150 described above is that the support member 150 can transfer the imposed loads to appropriate reaction locations on the front spar 200. The slots 156 at each of the attachment portions 154a–d, for example, allow only axial loads to be transferred to corresponding first and second spar ribs 202a and 202b, while the first coupling 140 can transfer the shear loads to the spar web 204. By transferring loads to the appropriate reaction locations, the fluid conduit 130 can satisfy the various loading conditions imposed by regulatory requirements. Another advantage of this arrangement is that it can reduce the likelihood of leakage and/or failure of the fluid conduit 130 because at least a portion of the imposed loads are transferred from the fluid conduit 130 to the appropriate portions of the aircraft (e.g., the first and second spar ribs 202a and 202b of the front spar 200).

Another feature of at least some of the embodiments of the fluid conduit 130 and support structure 150 described above is that the fluid conduit 130 can be installed with and/or uninstalled from the front spar 200 using common hand tools. An advantage of this feature is that it can greatly reduce the time and cost associated with installation and/or replacement of the fluid conduit 130 and/or the support member 150. Furthermore, the interchangeability of the various components described above can significantly reduce the time and expense of repair and/or retrofitting.

From the foregoing, it will be appreciated that specific embodiments of the invention have been described herein for purposes of illustration, but that various modifications may be made without deviating from the invention. For example, the support member may have a different configuration and/or may be attached to the fluid conduit and/or the front spar using a different arrangement. Aspects of the invention described in the context of particular embodiments may be combined or eliminated in other embodiments. For example, the fluid conduits can be used to transfer liquids other than fuel. The fluid conduit and corresponding support member may also be operably coupled to structures within the aircraft other than the front spar. Moreover, aspects of the above-described fluid conduits and corresponding support members can be located in vehicles or devices other than aircraft. Further, while advantages associated with certain embodiments of the invention have been described in the context of those embodiments, other embodiments may also exhibit such advantages, and not all embodiments need necessarily exhibit such advantages to fall within the scope of the invention. Accordingly, the invention is not limited, except as by the appended claims.

We claim:

1. An aircraft, comprising:
a fuselage portion;
a spar carried by at least one of the fuselage portion and the wing portion, the spar including a first spar rib and a second spar rib spaced apart from the first spar rib;
a fuel tank carried by at least one of the fuselage portion and the wing portion;
a fluid conduit proximate to the spar and operably coupled to the fuel tank; and
a support member carrying the fluid conduit, the support member including a first support member portion attached to one side of the fluid conduit and a second support member portion attached to a generally opposite side of the fluid conduit as the first support member portion, the support member being operably coupled to the spar and positioned to transfer at least approximately all of the axial loads from the fluid conduit to at least one of the first spar rib and the second spar rib.

2. The aircraft of claim 1 wherein the support member includes:
a first support member portion attached to one side of the fluid conduit, the first support member portion including a first attachment portion operably coupled to the first spar rib and a second attachment portion operably coupled to the second spar rib; and
a second support member portion attached to a generally opposite side of the fluid conduit as the first support member portion, the second support member portion including a third attachment portion operably coupled to the first spar rib and a fourth attachment portion operably coupled to the second spar rib, wherein at least a portion of the axial loads from the fluid conduit are transferred from the first and third attachment portions of the support member to the first spar rib, and a remaining portion of the axial loads from the fluid conduit are transferred from the second and fourth attachment portions of the support member to the second spar rib.

3. The aircraft of claim 2 wherein:
the first attachment portion and the third attachment portion are generally aligned with each other along a first alignment axis; and
the second attachment portion and the fourth attachment portion are generally aligned with each other along a second alignment axis.

4. The aircraft of claim 2 wherein:
the first attachment portion includes a first slot and a first fastener slidably received through the first slot to operably couple the first attachment portion to the first spar rib;
the second attachment portion includes a second slot and a second fastener slidably received through the second slot to operably couple the second attachment portion to the second spar rib;
the third attachment portion includes a third slot and a third fastener slidably received through the third slot to operably couple the third attachment portion to the first spar rib; and
the fourth attachment portion includes a fourth slot and a fourth fastener slidably received through the fourth slot to operably couple the fourth attachment portion to the second spar rib.

5. The aircraft of claim 1 wherein:
the spar further includes (a) a spar web between the first spar rib and the second spar rib, (b) a fluid passageway extending at least partially through the spar web, and (c) a spar coupling in at least a portion of the fluid passageway and in fluid communication with the fluid conduit; and
the fluid conduit includes a first end and a second end spaced apart from the first end, the first end having a first coupling operably coupled to the spar coupling and the second end having a second coupling positioned for engagement with a corresponding coupling of another fluid conduit to form a removable connection, and wherein the first coupling is positioned to transfer at least approximately all of the shear loads from the fluid conduit to the spar.

6. The aircraft of claim 5 wherein the spar coupling and the first coupling form a locking feature between the fluid conduit and the spar.

7. The aircraft of claim 6 wherein the first coupling includes a plurality of teeth, and wherein the individual teeth are engageable with corresponding portions of the spar coupling to releasably secure the fluid conduit to the spar.

8. The aircraft of claim 6 wherein the locking feature is positioned to at least temporarily carry all of the axial loads and the shear loads from the fluid conduit.

9. The aircraft of claim 1 wherein the support member is positioned to be installed and uninstalled from the spar using common hand tools.

10. The aircraft of claim 1 wherein the fluid conduit includes a first wall aligned with a flow direction in the fluid conduit and a second wall disposed annularly around the first wall, the second wall being aligned with the flow direction, and wherein the second wall is isolated from fluid communication with the first wall.

11. The aircraft of claim 1 wherein the fluid conduit is positioned to transfer fuel to the fuel tank, and wherein the aircraft further comprises an aerial refueling system coupled to the fuel tank to receive fuel from the fuel tank.

* * * * *

UNITED STATES PATENT AND TRADEMARK OFFICE
CERTIFICATE OF CORRECTION

| | | |
|---|---|---|
| PATENT NO. | : 7,293,741 B2 | Page 1 of 1 |
| APPLICATION NO. | : 11/150005 | |
| DATED | : November 13, 2007 | |
| INVENTOR(S) | : Carns et al. | |

It is certified that error appears in the above-identified patent and that said Letters Patent is hereby corrected as shown below:

On the title page, item (54), and Col. 1, line 1, in the Patent Title, delete "SYSTEM" and replace with -- SYSTEMS --.

On the title page, item (57), under "Abstract", in column 2, line 2, after "conduits" delete ", are disclosed".

On the title page, item (57), under "Abstract", in column 2, line 5, after "by" insert -- at --.

On page 2, item (56), under "Other Publications", in column 2, line 5, delete "MotorpPresse" and insert -- MotorPresse --, therefor.

On page 2, item (56), under "Other Publications", in column 2, line 11, delete "Pheumatics," and insert -- Pneumatics, --, therefor.

In column 1, line 61, after "by" insert -- at --.

In column 7, line 8, in Claim 1, after "portion;" insert -- a wing portion; --.

In column 7, lines 25-28, in Claim 2, delete "the support member includes: a first support member portion attached to one side of the fluid conduit," and insert -- : --, therefor.

In column 7, lines 28-29, in Claim 2, delete "including" and insert -- includes --, therefor.

In column 7, lines 32-34, in Claim 2, after "rib; and" delete "a second support member portion attached to a generally opposite side of the fluid conduit as the first support member portion,".

In column 7, line 35, in Claim 2, delete "including" and insert -- includes --, therefor.

Signed and Sealed this

Twenty-first Day of September, 2010

David J. Kappos
*Director of the United States Patent and Trademark Office*